(12) United States Patent
Shiratori

(10) Patent No.: US 12,461,406 B2
(45) Date of Patent: Nov. 4, 2025

(54) DIMMING DEVICE AND DIMMING METHOD

(71) Applicant: AISIN CORPORATION, Kariya (JP)

(72) Inventor: Yusuke Shiratori, Kariya (JP)

(73) Assignee: AISIN CORPORATION, Kariya (JP)

( * ) Notice: Subject to any disclaimer, the term of this patent is extended or adjusted under 35 U.S.C. 154(b) by 100 days.

(21) Appl. No.: 18/441,024

(22) Filed: Feb. 14, 2024

(65) Prior Publication Data

US 2024/0310665 A1    Sep. 19, 2024

(30) Foreign Application Priority Data

Mar. 16, 2023  (JP) .................................. 2023-041832

(51) Int. Cl.
*G02F 1/133* (2006.01)
*G02F 1/1334* (2006.01)

(52) U.S. Cl.
CPC ........ *G02F 1/13306* (2013.01); *G02F 1/1334* (2013.01)

(58) Field of Classification Search
CPC ............................ G02F 1/13306; G02F 1/1334
See application file for complete search history.

(56) References Cited

U.S. PATENT DOCUMENTS

| 10,520,778 B2 * | 12/2019 | Chen ...................... G02B 30/27 |
| 2013/0088674 A1 * | 4/2013 | Yu ..................... G02F 1/134363 |
| | | 349/123 |
| 2015/0002041 A1 * | 1/2015 | Lee ........................ H05B 45/382 |
| | | 315/206 |
| 2020/0394972 A1 * | 12/2020 | Huang ..................... G09G 5/10 |
| 2024/0069369 A1 * | 2/2024 | He ......................... G02F 1/1323 |
| 2024/0310665 A1 * | 9/2024 | Shiratori ............... G02F 1/1334 |
| 2024/0361653 A1 * | 10/2024 | Shimoshikiryoh ......................... |
| | | G02F 1/13306 |
| 2025/0004332 A1 * | 1/2025 | Yoshida ............ G02F 1/134309 |
| 2025/0068013 A1 * | 2/2025 | Chen .................... G02F 1/13471 |

FOREIGN PATENT DOCUMENTS

| CN | 110476111 A | * | 11/2019 | ........... G02F 1/1334 |
| JP | 2011-209826 A | | 10/2011 | |
| JP | 2013-72895 A | | 4/2013 | |
| WO | WO-2018130044 A1 | * | 7/2018 | ........... G02F 1/1323 |
| WO | WO-2018186447 A1 | * | 10/2018 | ......... G02F 1/13306 |
| WO | WO-2020091812 A1 | * | 5/2020 | ......... G02F 1/13439 |
| WO | WO-2020258516 A1 | * | 12/2020 | ....... G02F 1/133606 |
| WO | WO-2025043712 A1 | * | 3/2025 | ........... G02F 1/1337 |

* cited by examiner

*Primary Examiner* — Adam D Houston
(74) *Attorney, Agent, or Firm* — Oblon, McClelland, Maier & Neustadt, L.L.P.

(57) ABSTRACT

A dimming device for controlling a dimming rate of a dimming member includes a DC/AC inverter to convert a direct-current voltage into an alternating-current voltage requiring a predetermined period and amplitude; and an inverter drive unit to drive the DC/AC inverter based on an opening and closing control signal. The inverter drive unit includes a command value generation unit to generate an opening and closing command value for controlling an opening and closing state of a switching element provided in the DC/AC inverter.

5 Claims, 5 Drawing Sheets

DIMMING DEVICE AND DIMMING METHOD

CROSS REFERENCE TO RELATED APPLICATIONS

This application is based on and claims priority under 35 U.S.C. § 119 to Japanese Patent Application 2023-041832, filed on Mar. 16, 2023, the entire content of which is incorporated herein by reference.

TECHNICAL FIELD

This disclosure relates to a dimming device for controlling a dimming rate of a dimming member, and a dimming method thereof.

BACKGROUND DISCUSSION

In the related art, a technique of controlling a transmittance of light on a portion where the light is incident has been used. As such a technique, for example, there is one disclosed in JP 2013-72895A (Reference 1) whose source is shown below.

Reference 1 discloses a liquid crystal dimming device. The liquid crystal dimming device drives a liquid crystal dimming element based on a rectangular-wave shaped or trapezoidal-wave shaped signal.

A rectangular wave has a steep waveform rise. Further, since the rectangular wave and the trapezoidal wave are implemented by overlapping a large number of high-order harmonic components on a sine wave, the rectangular wave and the trapezoidal wave may become a generation source of harmonic noise, and marketability of the dimming member is reduced. Further, in order to reduce such noise, it is considered to provide a noise filter, but a cost and a size are increased.

A need thus exists for a dimming device and a dimming method which are not susceptible to the drawback mentioned above.

SUMMARY

A characteristic configuration of a dimming device according to an aspect of this disclosure is a dimming device for controlling a dimming rate of a dimming member, the dimming device including: a DC/AC inverter configured to convert a direct-current voltage into an alternating-current voltage requiring a predetermined period and amplitude; and an inverter drive unit configured to drive the DC/AC inverter based on an opening and closing control signal. The inverter drive unit includes a command value generation unit configured to generate an opening and closing command value for controlling an opening and closing state of a switching element provided in the DC/AC inverter. The command value generation unit generates, by overlapping a plurality of harmonic components of a fundamental wave formed of a sine wave on the fundamental wave, the opening and closing command value such that each of a peak region including a peak value and a bottom region including a bottom value of the opening and closing control signal includes a low-curvature arc-shaped portion and a large-curvature arc-shaped portion in which both ends of the low-curvature arc-shaped portion have a large-curvature arc shape having a curvature radius smaller than a curvature radius of the low-curvature arc-shaped portion.

A characteristic configuration of a dimming method according to another aspect of this disclosure is a dimming method in which a dimming rate of a dimming member is controlled by a computer, the dimming method including: a conversion step of converting a direct-current voltage into an alternating-current voltage requiring a predetermined period and amplitude by driving a DC/AC inverter based on an opening and closing control signal; and a drive step of driving the DC/AC inverter. The drive step includes a command value generation step of generating an opening and closing command value for controlling an opening and closing state of a switching element provided in the DC/AC inverter. In the command value generation step, by overlapping a plurality of harmonic components of a fundamental wave formed of a sine wave on the fundamental wave, the opening and closing command value is generated such that each of a peak region including a peak value and a bottom region including a bottom value of the opening and closing control signal includes a low-curvature arc-shaped portion and a large-curvature arc-shaped portion in which both ends of the low-curvature arc-shaped portion have a large-curvature arc shape having a curvature radius smaller than a curvature radius of the low-curvature arc-shaped portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A dimming device according to the present disclosure can control a dimming rate of a dimming member. Hereinafter, a dimming device 1 according to the present embodiment will be described.

Figure 1:
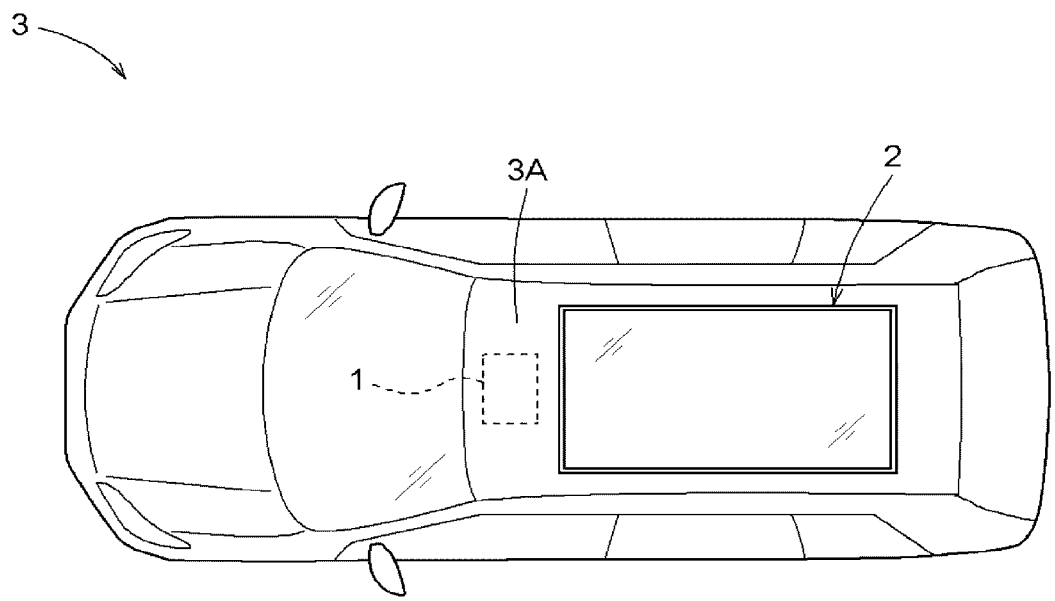
FIG. 1 is a diagram showing a vehicle provided with a dimming member.

FIG. 1 shows a vehicle 3 including a dimming member 2 where a dimming rate can be changed by the dimming device 1. In the present embodiment, the dimming member 2 is provided on a sunroof provided on a roof 3A of the vehicle 3. As the dimming member 2, it is possible to use, for example, a polymer dispersed liquid crystal (PDLC) that can control optical characteristics such as a total light transmittance, a diffused light transmittance, a parallel line transmittance, and a fogging rate calculated based on the total light transmittance, the diffused light transmittance, and the parallel line transmittance according to an amplitude value of an applied alternating-current voltage. The dimming device 1 can change the dimming rate of such a dimming member 2 to adjust a diffusion amount of transmitted light emitted into a vehicle. Here, the dimming rate is a ratio at which a diffusion degree of light is adjusted. For example, when the dimming rate is high, the transmittance of the parallel line that travels straight through the dimming member 2 becomes high, resulting in transparency. In contrast, when a transmittance is small, the transmittance of the parallel line that travels straight through the dimming member 2 becomes low, resulting in increased turbidity and opacity. Therefore, it is assumed that the dimming rate and the parallel line transmittance mean the same thing from a viewpoint of adjusting the diffusion amount of the transmitted light emitted into interior of the vehicle 3. The dimming device 1 may change the dimming rate over an entire surface of the dimming member 2, or may change the dimming rate for each portion divided into a predetermined size.

Figure 2:
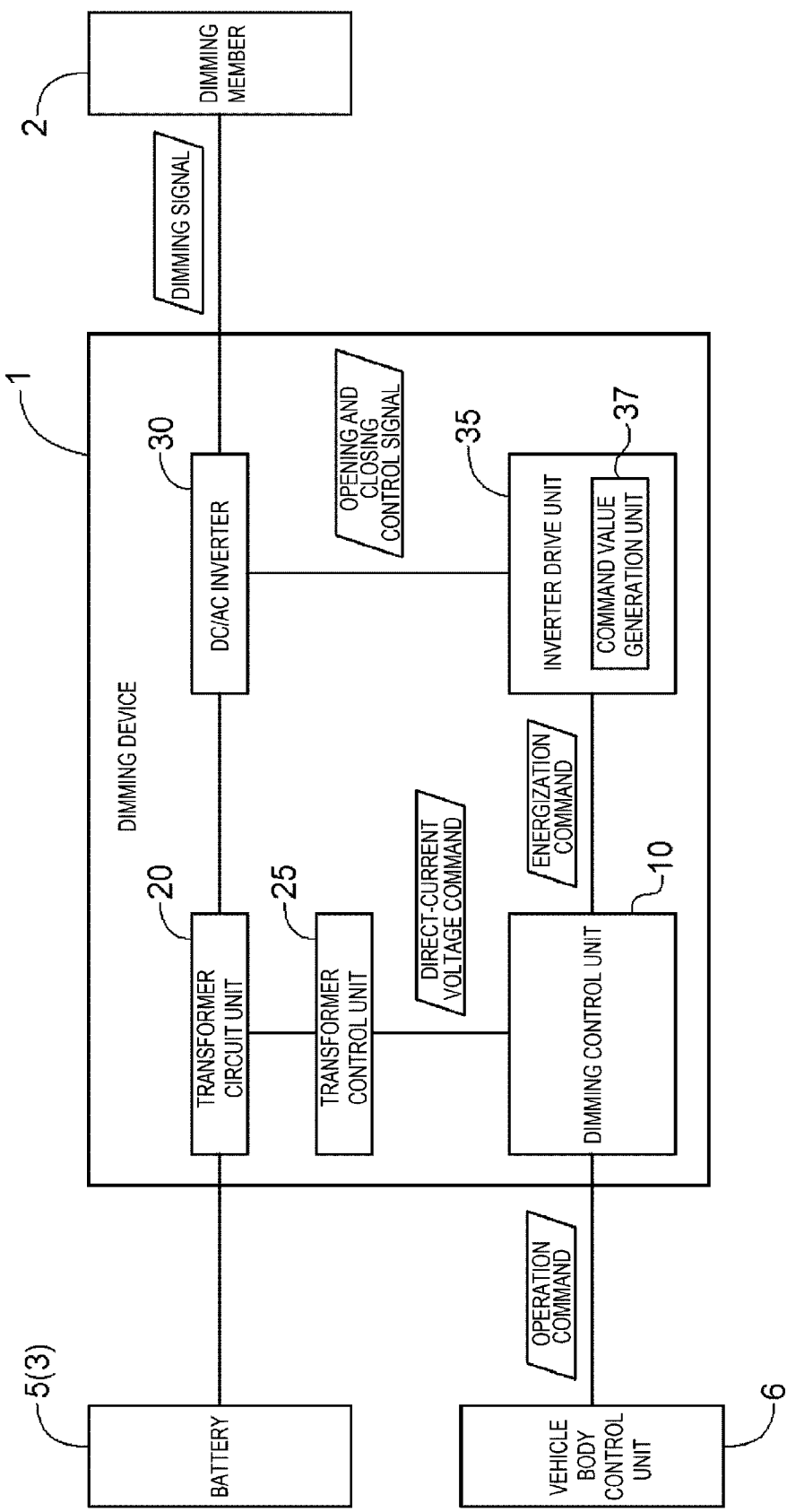
FIG. 2 is a block diagram schematically showing a configuration of a dimming device.

FIG. 2 is a block diagram schematically showing a configuration of the dimming device 1. As shown in FIG. 2, the dimming device 1 according to the present embodiment includes a dimming control unit 10, a transformer circuit unit 20, a transformer control unit 25, a DC/AC inverter 30, and an inverter drive unit 35. Each functional unit is constructed by hardware, software, or both with a CPU as a core member in order to change the dimming rate of the dimming member 2. FIG. 2 also shows a battery 5 and a vehicle body control unit 6.

The transformer circuit unit 20 converts an output voltage of the battery 5 into a direct-current voltage having a predetermined voltage value, and outputs the direct-current voltage. The battery 5 is a battery mounted on the vehicle 3. Therefore, the output voltage of the battery 5 corresponds to a direct-current voltage output from the battery 5. Here, in order to change the dimming rate of the dimming member 2 performed by the dimming device 1, an alternating-current voltage having a large voltage amplitude value (for example, an amplitude of 100 V or more) is required. The transformer circuit unit 20 generates a direct-current voltage having a voltage value corresponding to such a voltage amplitude value to output the direct-current voltage to the DC/AC inverter 30 to be described later.

When a voltage value of a voltage output from the battery 5 is lower than a voltage value of the direct-current voltage to be output to the DC/AC inverter 30, the transformer circuit unit 20 may use a step-up DC/DC converter. Further, when the voltage value of the voltage output from the battery 5 is higher than the voltage value of the direct-current voltage to be output to the DC/AC inverter 30, a step-down DC/DC converter may be used. Furthermore, when the voltage value of the voltage output from the battery 5 is substantially the same as the voltage value of the direct-current voltage to be output to the DC/AC inverter 30, a step-up/step-down DC/DC converter may be used, or the DC/DC converter may not be used. Further, as described above, since a voltage applied to the transformer circuit unit 20 is large, the transformer circuit unit 20 preferably uses an insulated converter whose primary side and secondary side are insulated.

The transformer control unit 25 drives the transformer circuit unit 20. The transformer control unit 25 drives, for example, a switching element provided in the transformer circuit unit 20 by PWM control to perform control such that an output voltage of the transformer circuit unit 20 becomes a desired voltage value. Therefore, the transformer control unit 25 may monitor the output voltage of the transformer circuit unit 20, and perform control such that the output voltage becomes a desired voltage value by feedback control.

Here, in the present example, an operation command based on an operation instruction from a user of the vehicle 3 is transmitted from the vehicle body control unit 6 to the dimming control unit 10. For example, information indicating the changed dimming rate of the dimming member 2 is included in the operation command. The dimming control unit 10 calculates an input voltage amplitude to the dimming member 2 according to the dimming rate included in the operation command, and instructs the input voltage amplitude to the transformer control unit 25 as a direct-current voltage command. The transformer control unit 25 controls the transformer circuit unit 20 based on the direct-current voltage command from the dimming control unit 10.

The DC/AC inverter 30 converts a direct-current voltage into an alternating-current voltage requiring a predetermined period and amplitude. The direct-current voltage is a direct-current voltage generated by the transformer circuit unit 20 described above. The DC/AC inverter 30 is provided with two leg units connected in parallel between two power supply lines, and each of the two leg units includes a high-side switching element and a low-side switching element connected in series. In this way, from the so-called full-bridge type DC/AC inverter 30 implemented by a total of four switching elements, for example, a dimming signal that dims the dimming member 2 whose frequency is several tens of Hz with the output voltage of the transformer circuit unit 20 having both positive and negative amplitudes is output as an alternating-current voltage.

The inverter drive unit 35 drives the DC/AC inverter 30 based on an opening and closing control signal. The opening and closing control signal corresponds to a PWM control signal having a duty ratio corresponding to a desired dimming rate of the dimming member 2.

The inverter drive unit 35 includes a command value generation unit 37 that generates an opening and closing command value for controlling an opening and closing state of each of the switching elements provided in the DC/AC inverter 30. The switching elements provided in the DC/AC inverter 30 are two sets of high-side switching elements and low-side switching elements provided in each of the two leg units provided in the DC/AC inverter 30 described above. The opening and closing state of the switching element corresponds to an opening state and a closing state of the switching element. A command value for controlling such an opening and closing state corresponds to the opening and closing command value. Generating the opening and closing command value means calculating the opening and closing command value. Therefore, the command value generation unit 37 calculates the command value for controlling the opening and closing state of each of the two sets of high-side switching elements and low-side switching elements provided in each of the two leg units provided in the DC/AC inverter 30 as the opening and closing command value. The inverter drive unit 35 generates the opening and closing control signal based on the opening and closing command value calculated by the command value generation unit 37, and controls the opening and closing state of each of the switching elements provided in the DC/AC inverter 30.

Here, in the present example, as described above, the dimming control unit 10 calculates time to energize the dimming member 2 according to the dimming rate included in the operation command transmitted from the vehicle body control unit 6, and instructs the time to the inverter drive unit 35 as an energization command. The command value generation unit 37 calculates the opening and closing command value based on the energization command from the dimming control unit 10.

Figure 4:
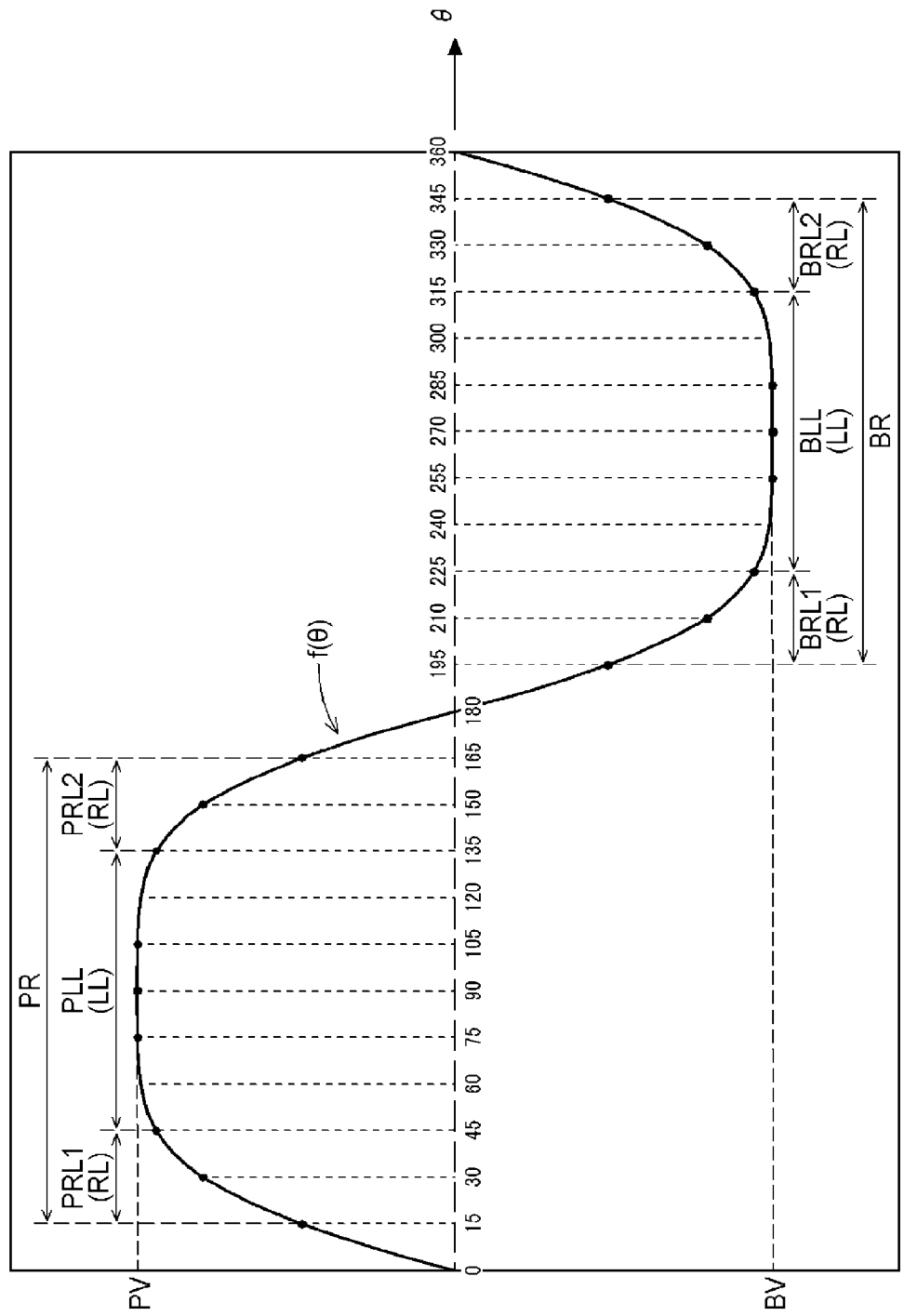
FIG. 4 is an illustrative diagram of the opening and closing control signal.

The command value generation unit 37 generates, by overlapping a plurality of harmonic components of a fundamental wave formed of a sine wave on the fundamental wave, the opening and closing command value such that each of a peak region PR including peak values PV and a bottom region BR including bottom values BV of the opening and closing control signal includes a low-curvature arc-shaped portion LL having a predetermined curvature radius and large-curvature arc-shaped portions RL in which both ends of the low-curvature arc-shaped portion LL have a large-curvature arc shape having a curvature radius smaller than the curvature radius of the low-curvature arc-shaped portion LL (see FIG. 4). The fundamental wave formed of the sine wave is a waveform that is a source of the opening and closing control signal generated by the command value generation unit 37. When the sine wave is f1(θ) and a maximum value is X, f1(θ) is expressed as follows.

$$f1(\theta) = X \times A \times \sin \theta \qquad (1)$$

Here, A is a predetermined coefficient.

The plurality of harmonic components of the fundamental wave correspond to an n-th harmonic component (where n is an integer) of f1(θ). In the present embodiment, as the harmonic components, a third harmonic component having a frequency three times that of the fundamental wave and a fifth harmonic component having a frequency five times that of the fundamental wave are used. When the third harmonic component is f3(θ) and the fifth harmonic component is f5(θ), f3(θ) and f5(θ) are expressed as follows.

$$f3(\theta) = X \times B \times \sin 3\theta \qquad (2)$$

$$f5(\theta) = X \times C \times \sin 5\theta \qquad (3)$$

Here, B and C are predetermined coefficients.

Figure 3A:
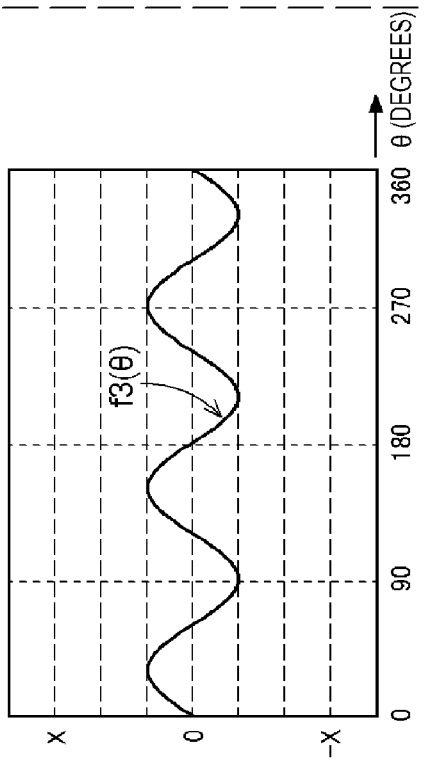
FIG. 3A, FIG. 3B, FIG. 3C, and FIG. 3D are diagrams showing an opening and closing control signal based on a sine wave, a third harmonic component, and a fifth harmonic component.
Figure 3B:
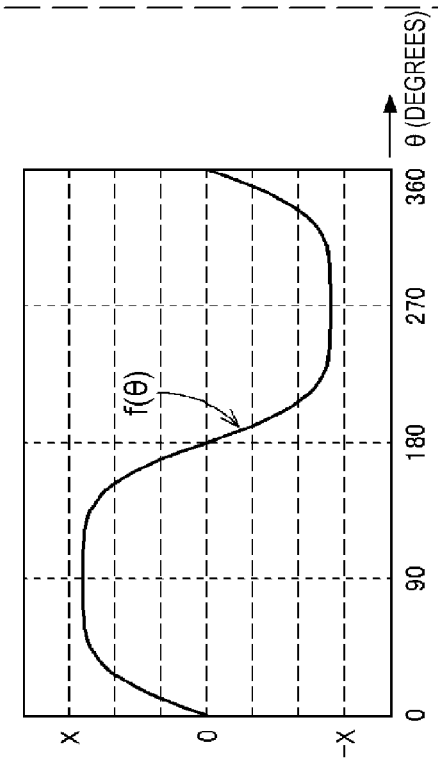
Figure 3C:
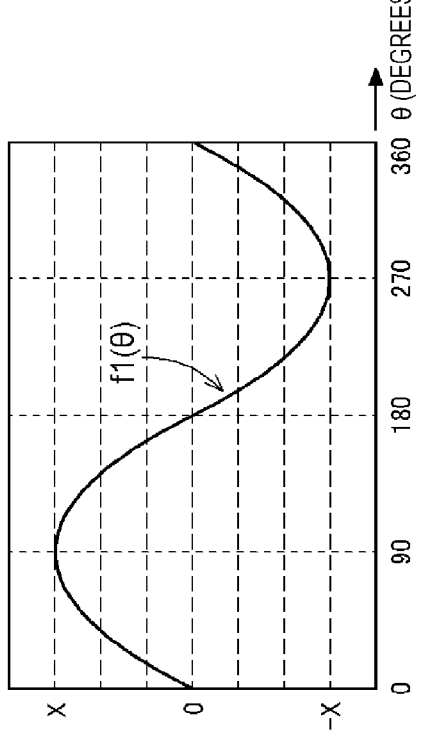

FIG. 3A shows a waveform of f1(θ) expressed by Equation (1). Further, FIG. 3B shows a waveform of f3(θ) expressed by Equation (2). Further, FIG. 3C shows a waveform of f5(θ) expressed by Equation (3). The command value generation unit 37 generates the opening and closing command value such that the opening and closing control signal has a waveform obtained by overlapping the waveform in FIG. 3B and the waveform in FIG. 3C on the waveform in FIG. 3A.

Here, FIG. 4 shows the opening and closing control signal generated based on the opening and closing command value. The peak region PR including the peak values PV described above includes a low-curvature arc-shaped portion (an example of the "low-curvature arc-shaped portion LL") PLL, a first peak-side arc-shaped portion (an example of the "large-curvature arc-shaped portion RL") PRL1, and a second peak-side arc-shaped portion (an example of the "large-curvature arc-shaped portion RL") PRL2. The low-curvature arc-shaped portion PLL is a portion where the peak values PV are approximately constant. The first peak-side arc-shaped portion PRL1 is a portion that is connected to one end portion of the peak-side linear portion PLL and has an arc shape. The second peak-side arc-shaped portion PRL2 is a portion that is connected to the other end portion of the peak-side linear portion PLL and has an arc shape.

The bottom region BR including the bottom values BV includes a low-curvature arc-shaped portion (an example of the "low-curvature arc-shaped portion LL") BLL, a first bottom-side arc-shaped portion (an example of the "large-curvature arc-shaped portion RL") BRL1, and a second bottom-side arc-shaped portion (an example of the "large-curvature arc-shaped portion RL") BRL2. The low-curvature arc-shaped portion BLL is a portion where the bottom values BV are approximately constant. The first bottom-side arc-shaped portion BRL1 is a portion that is connected to one end portion of the low-curvature arc-shaped portion BLL and has an arc shape. The second bottom-side arc-shaped portion BRL2 is a portion that is connected to the other end portion of the low-curvature arc-shaped portion BLL and has an arc shape.

Here, as described above, the large-curvature arc-shaped portion RL has the large-curvature arc shape having the curvature radius smaller than the curvature radius of the low-curvature arc-shaped portion LL. Specifically, as shown in FIG. 4, when an angle θ is divided every 15 degrees, a curvature radius of a circle passing through three points in total including one point before and one point after a central portion of the large-curvature arc-shaped portion RL is smaller than a curvature radius of a circle passing through three points in total including one point before and one point after a central portion of the low-curvature arc-shaped portion LL.

Specifically, each of a curvature radius of a circle passing through three points at 15 degrees, 30 degrees, and 45 degrees, a curvature radius of a circle passing through three points at 135 degrees, 150 degrees, and 165 degrees, a curvature radius of a circle passing through three points at 195 degrees, 210 degrees, and 225 degrees, and a curvature radius of a circle passing through three points at 315 degrees, 330 degrees, and 345 degrees is smaller than a curvature radius of a circle passing through three points at 75 degrees, 90 degrees, and 105 degrees, and a curvature radius of a circle passing through three points at 255 degrees, 270 degrees, and 285 degrees. For example, the curvature radius of the large-curvature arc-shaped portion RL is preferably set to be 1/30 or less of the curvature radius of the low-curvature arc-shaped portion LL (to be a difference of 30 times or more).

Figure 3D:
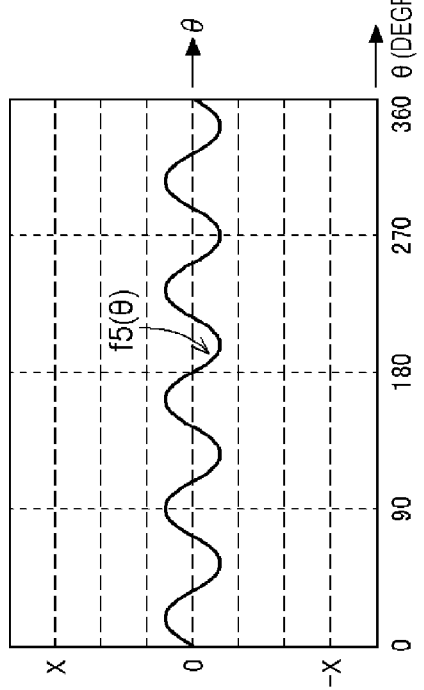

The command value generation unit 37 generates the opening and closing command value such that the opening and closing control signal has a waveform as shown in FIG. 3D based on the fundamental wave in FIG. 3A, the third harmonic component in FIG. 3B, and the fifth harmonic component in FIG. 3C.

The command value generation unit 37 generates the opening and closing command value such that a period is extended during which an amplitude value of the opening and closing control signal is smaller than a crest value of the fundamental wave and a transmittance of the dimming member 2 is equal to or larger than a predetermined value. That is, the crest value of the fundamental wave is X as shown in FIG. 3A, and the command value generation unit 37 sets A in Equation (1), B in Equation (2), and C in Equation (3) such that a crest value of the opening and closing control signal is at least smaller than X as shown in FIG. 3D. When the opening and closing command value generated by the command value generation unit 37 is f(θ), f(θ) is expressed as follows.

$$f(\theta) = X \times (A \sin \theta + B \sin 3\theta + C \sin 5\theta) \qquad (4)$$

The command value generation unit 37 generates the opening and closing command value such that an effective value of the opening and closing control signal is substantially the same as an effective value of the fundamental wave. That is, the opening and closing command value is generated such that an effective value Xrms of the opening and closing control signal is as in Equation 5.

$$Xrms = \frac{X}{\sqrt{2}} \quad (5)$$

Accordingly, for example, the crest value of the opening and closing control signal can be reduced to about 80% of the maximum value (X).

The inverter drive unit 35 controls the DC/AC inverter 30 by the opening and closing control signal based on such an opening and closing command value. Therefore, the dimming rate of the dimming member 2 is changed based on such an opening and closing control signal.

Figure 5A:
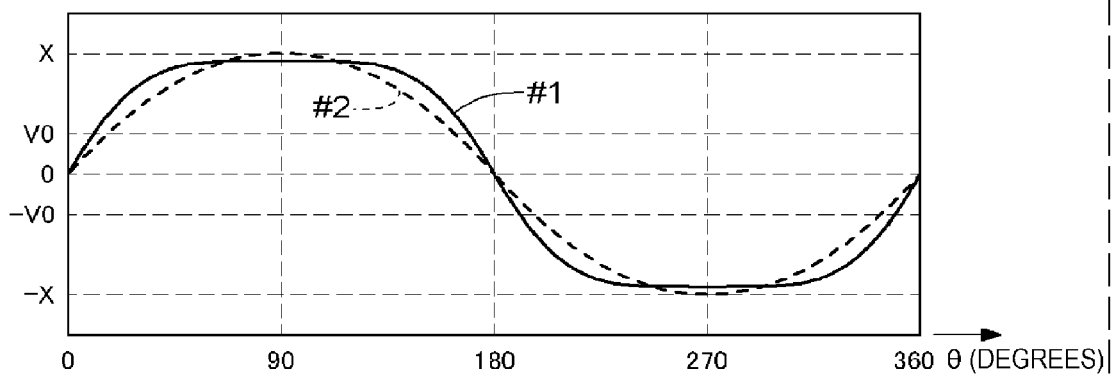
FIG. 5A, FIG. 5B, and FIG. 5C are diagrams showing a difference between dimming based on the sine wave and dimming based on the opening and closing control signal.

FIG. 5A shows the opening and closing control signal based on the opening and closing command value described above and an opening and closing control signal using a sine wave. In the following description, the opening and closing control signal based on the opening and closing command value is described as an opening and closing control signal (#1), and the opening and closing control signal using the sine wave is described as an opening and closing control signal (#2).

Figure 5B:
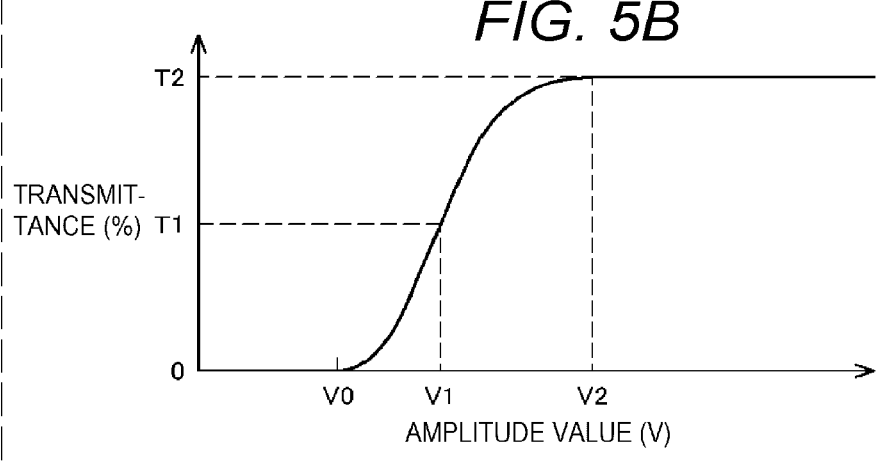

FIG. 5B shows a relationship between the amplitude value of the alternating-current voltage applied to the dimming member 2 and the parallel line transmittance (dimming rate). In the example in FIG. 5B, when the amplitude value is V0 [V] or less, the parallel line transmittance is 0 [%]. When the amplitude value is V1 [V], the parallel line transmittance is T1 [%]. When the amplitude value is V2 [V] or more, the parallel line transmittance is T2 [%]. When the amplitude value is from V1 [V] to V2 [V], the parallel line transmittance changes in a manner of being in proportion to the amplitude value.

Figure 5C:
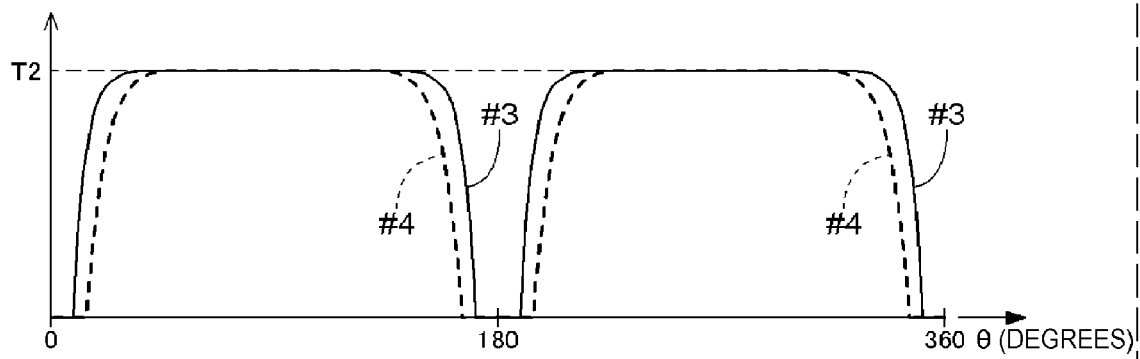

FIG. 5C shows a parallel line transmittance (#3) when an alternating-current voltage corresponding to the opening and closing control signal (#1) in FIG. 5A is applied to the dimming member 2 having a relationship between the amplitude value and the parallel line transmittance in FIG. 5B, and a parallel line transmittance (#4) when an alternating-current voltage corresponding to the opening and closing control signal (#2) is applied to the dimming member 2 having a relationship between the amplitude value and the parallel line transmittance in FIG. 5B. As shown in FIG. 5B, the parallel line transmittance of the dimming member 2 increases when the amplitude value is larger than V0 [V]. As shown in FIG. 5A, although the opening and closing control signal (#1) and the opening and closing control signal (#2) have effective values substantially the same as each other, time during which a voltage value is V0 [V] or higher is longer for the opening and closing control signal (#1) than for the opening and closing control signal (#2). Therefore, as shown in FIG. 5C, even when the effective values are substantially the same as each other, a ratio of light transmission can be made larger when the opening and closing control signal (#1) is applied than when the opening and closing control signal (#2) is applied. In the example in FIG. 5C, an average transmittance when the opening and closing control signal (#2) is applied is about 55% of T2 [%], but an average transmittance when the opening and closing control signal (#1) is applied can be increased to about 60% of T2 [%]. Therefore, when a desired parallel line transmittance is considered as a reference, since, for example, the amplitude value of the alternating-current voltage to be applied to the dimming member 2 can be reduced, power consumption can be reduced.

As described above, according to the present dimming device 1, the parallel line transmittance can be improved while reducing the crest value and preventing the harmonic component. The control of the dimming device 1 described above can also be defined as a dimming method in which the dimming rate of the dimming member 2 is controlled by a computer.

First, the transformer circuit unit 20 converts an output voltage of the battery 5 into a direct-current voltage having a predetermined voltage value and outputs the direct-current voltage. Such control of the transformer circuit unit 20 is performed by the transformer control unit 25. Such control of the transformer circuit unit 20 performed by the transformer control unit 25 corresponds to a transformer circuit control step in the dimming method described above. Further, the step of converting the output voltage of the battery 5 into the direct-current voltage having the predetermined voltage value by the transformer circuit unit 20 corresponds to a voltage conversion step in the dimming method described above.

The DC/AC inverter 30 is driven based on the opening and closing control signal, and converts the direct-current voltage from the transformer circuit unit 20 into the alternating-current voltage requiring the predetermined period and amplitude. Such a step of converting the direct-current voltage into the alternating-current voltage by the DC/AC inverter 30 corresponds to a conversion step in the dimming method described above.

The inverter drive unit 35 drives the DC/AC inverter 30 based on the opening and closing control signal. Such a step of driving the DC/AC inverter 30 based on the opening and closing control signal corresponds to a drive step in the dimming method described above.

In the drive step, the opening and closing command value for controlling the opening and closing state of the switching element provided in the DC/AC inverter 30 is generated. Such a step of generating the opening and closing command value corresponds to a command value generation step in the dimming method described above.

In the command value generation step, the opening and closing command value is generated such that the plurality of harmonic components of the fundamental wave formed of the sine wave are overlapped on the fundamental wave, the opening and closing control signal includes the peak region PR including the peak values PV and the bottom region BR including the bottom values BV, and each of the peak region PR and the bottom region BR includes the low-curvature arc-shaped portion LL where the peak values PV and the bottom values BV are located, and the large-curvature arc-shaped portions RL in which both ends of the low-curvature arc-shaped portion LL have the large-curvature arc shape having the curvature radius smaller than the curvature radius of the low-curvature arc-shaped portion LL.

The dimming device 1 can change the dimming rate of the dimming member 2 by such a dimming method.

Other Embodiments

In the embodiment described above, it has been described that the polymer dispersed liquid crystal (PDLC) can be used as the dimming member 2. However, for the dimming member 2, in addition to the polymer dispersed liquid crystal, it is possible to use, for example, polymer network liquid crystals (PNLC), a suspended particle device (SPD), or a guest host liquid crystal as long as application of an alternating-current voltage is required to change the dimming rate. Of course, it is also possible to use other materials.

In the embodiment described above, an example of a case is set and described where the dimming member 2 is provided at the roof panel of the vehicle 3. Alternatively, the dimming member 2 may be provided at a side window, a rear window, a front window, or the like of the vehicle 3.

In the embodiment described above, an example of a case is set and described where the dimming member 2 is provided in the vehicle 3. Alternatively, the dimming member 2 may be provided in an object (for example, a building) other than the vehicle 3. The dimming device 1 can also change a dimming rate of the dimming member 2 provided in such an object other than the vehicle 3.

In the embodiment described above, an example of a case is set and described where the number of dimming members 2 is one. The number of dimming members 2 may be two or more. In this case, the dimming device 1 can individually change the dimming rate of each of the plurality of dimming members 2.

In the embodiment described above, the harmonic component is described as the third harmonic component having a frequency three times that of the fundamental wave and the fifth harmonic component having a frequency five times that of the fundamental wave. However, as the harmonic component, it is also possible to use only one of the third harmonic component and the fifth harmonic component. Further, as the harmonic component, it is also possible to use a seventh harmonic component having a frequency seven times that of the fundamental wave or a ninth harmonic component having a frequency nine times that of the fundamental wave. It has been described that the harmonic components are the third harmonic component and the fifth harmonic component, but the harmonic components also include a fairly small amount of other high-frequency components.

In the embodiment described above, it has been described that the command value generation unit 37 generates the opening and closing command value such that the period is extended during which the amplitude value of the opening and closing control signal is smaller than the crest value of the fundamental wave and the transmittance of the dimming member 2 is equal to or larger than the predetermined value. However, the command value generation unit 37 may generate the opening and closing command value such that the amplitude value of the opening and closing control signal is substantially the same as the crest value of the fundamental wave, or may generate the opening and closing command value such that the amplitude value of the opening and closing control signal is larger than the crest value of the fundamental wave.

The present disclosure can be used for the dimming device for controlling the dimming rate of the dimming member and the dimming method thereof.

A characteristic configuration of a dimming device according to an aspect of this disclosure is a dimming device for controlling a dimming rate of a dimming member, the dimming device including: a DC/AC inverter configured to convert a direct-current voltage into an alternating-current voltage requiring a predetermined period and amplitude; and an inverter drive unit configured to drive the DC/AC inverter based on an opening and closing control signal. The inverter drive unit includes a command value generation unit configured to generate an opening and closing command value for controlling an opening and closing state of a switching element provided in the DC/AC inverter. The command value generation unit generates, by overlapping a plurality of harmonic components of a fundamental wave formed of a sine wave on the fundamental wave, the opening and closing command value such that each of a peak region including a peak value and a bottom region including a bottom value of the opening and closing control signal includes a low-curvature arc-shaped portion and a large-curvature arc-shaped portion in which both ends of the low-curvature arc-shaped portion have a large-curvature arc shape having a curvature radius smaller than a curvature radius of the low-curvature arc-shaped portion.

In a configuration having such a characteristic, for example, an opening and closing control signal in which edges of a peak value and a bottom value having the rectangular wave have an arc shape, or an opening and closing control signal in which edges of a peak value and a bottom value having the trapezoidal wave have an arc shape is generated to drive the DC/AC inverter. As a result, it is possible not only to expand a region where a transmittance is equal to or larger than a constant value, but also to prevent occurrence of noise by reducing a steep rise of a waveform. Therefore, since occurrence of noise can be prevented without providing the noise filter, it is possible to implement a dimming device that can prevent the occurrence of the noise without increasing a cost and a size.

Preferably, the harmonic components are a third harmonic component having a frequency three times that of the fundamental wave, and a fifth harmonic component having a frequency five times that of the fundamental wave.

With such a configuration, by adjusting the amplitude of each of the third harmonic component and the fifth harmonic component overlapped on the fundamental wave, the opening and closing control signal can have a smooth waveform without a steep voltage fluctuation. Therefore, when a dimming element is dimmed, it is possible to implement a good dimming quality without flickering. Further, by overlapping the third harmonic component and the fifth harmonic component on the fundamental wave, an opening and closing control signal having a gradient can be set between the bottom region and the peak region of the opening and closing control signal.

Preferably, the command value generation unit generates the opening and closing command value such that a period is extended during which an amplitude value of the opening and closing control signal is smaller than a crest value of the fundamental wave and a transmittance of the dimming member is equal to or larger than a predetermined value.

With such a configuration, for example, as compared with a case where drive is performed by an opening and closing control signal having a sine wave, it is possible to reduce the crest value. Therefore, since it is possible to reduce a voltage value applied to the switching element provided in the DC/AC inverter, as compared with a case where drive is performed by the opening and closing control signal having the sine wave, it is possible to use an inexpensive switching element with a low withstand voltage.

A characteristic configuration of a dimming method according to another aspect of this disclosure is a dimming method in which a dimming rate of a dimming member is controlled by a computer, the dimming method including: a conversion step of converting a direct-current voltage into an alternating-current voltage requiring a predetermined period and amplitude by driving a DC/AC inverter based on an opening and closing control signal; and a drive step of driving the DC/AC inverter. The drive step includes a command value generation step of generating an opening and closing command value for controlling an opening and closing state of a switching element provided in the DC/AC inverter. In the command value generation step, by overlapping a plurality of harmonic components of a fundamental wave formed of a sine wave on the fundamental wave, the opening and closing command value is generated such that each of a peak region including a peak value and a bottom region including a bottom value of the opening and closing control signal includes a low-curvature arc-shaped portion and a large-curvature arc-shaped portion in which both ends of the low-curvature arc-shaped portion have a large-curvature arc shape having a curvature radius smaller than a curvature radius of the low-curvature arc-shaped portion.

In a configuration having such a characteristic, for example, an opening and closing control signal in which edges of a peak value and a bottom value having the rectangular wave have an arc shape, or an opening and closing control signal in which edges of a peak value and a bottom value having the trapezoidal wave have an arc shape is generated to drive the DC/AC inverter, whereby it is also possible not only to expand a region where a transmittance is equal to or larger than a constant value, but also to prevent occurrence of noise by reducing a steep rise of a waveform. Therefore, since occurrence of noise can be prevented without providing the noise filter, it is possible to implement a dimming method that can prevent the occurrence of the noise without increasing a cost and a size.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A dimming device for controlling a dimming rate of a dimming member, the dimming device comprising:
    a DC/AC inverter configured to convert a direct-current voltage into an alternating-current voltage requiring a predetermined period and amplitude; and
    an inverter drive unit configured to drive the DC/AC inverter based on an opening and closing control signal, wherein
    the inverter drive unit includes a command value generation unit configured to generate an opening and closing command value for controlling an opening and closing state of a switching element provided in the DC/AC inverter, and
    the command value generation unit generates, by overlapping a plurality of harmonic components of a fundamental wave formed of a sine wave on the fundamental wave, the opening and closing command value such that each of a peak region including a peak value and a bottom region including a bottom value of the opening and closing control signal includes a low-curvature arc-shaped portion and a large-curvature arc-shaped portion in which both ends of the low-curvature arc-shaped portion have a large-curvature arc shape having a curvature radius smaller than a curvature radius of the low-curvature arc-shaped portion.

2. The dimming device according to claim 1, wherein the harmonic components are a third harmonic component having a frequency three times that of the fundamental wave, and a fifth harmonic component having a frequency five times that of the fundamental wave.

3. The dimming device according to claim 1, wherein the command value generation unit generates the opening and closing command value such that a period is extended during which an amplitude value of the opening and closing control signal is smaller than a crest value of the fundamental wave and a transmittance of the dimming member is equal to or larger than a predetermined value.

4. The dimming device according to claim 2, wherein the command value generation unit generates the opening and closing command value such that a period is extended during which an amplitude value of the opening and closing control signal is smaller than a crest value of the fundamental wave and a transmittance of the dimming member is equal to or larger than a predetermined value.

5. A dimming method in which a dimming rate of a dimming member is controlled by a computer, the dimming method comprising:
    a conversion step of converting a direct-current voltage into an alternating-current voltage requiring a predetermined period and amplitude by driving a DC/AC inverter based on an opening and closing control signal; and
    a drive step of driving the DC/AC inverter, wherein
    the drive step includes a command value generation step of generating an opening and closing command value for controlling an opening and closing state of a switching element provided in the DC/AC inverter, and
    in the command value generation step, by overlapping a plurality of harmonic components of a fundamental wave formed of a sine wave on the fundamental wave, the opening and closing command value is generated such that each of a peak region including a peak value and a bottom region including a bottom value of the opening and closing control signal includes a low-curvature arc-shaped portion and a large-curvature arc-shaped portion in which both ends of the low-curvature arc-shaped portion have a large-curvature arc shape having a curvature radius smaller than a curvature radius of the low-curvature arc-shaped portion.

* * * * *